H. DOYLE.
SIFTER.
APPLICATION FILED APR. 16, 1915.
1,158,188.
Patented Oct. 26, 1915.
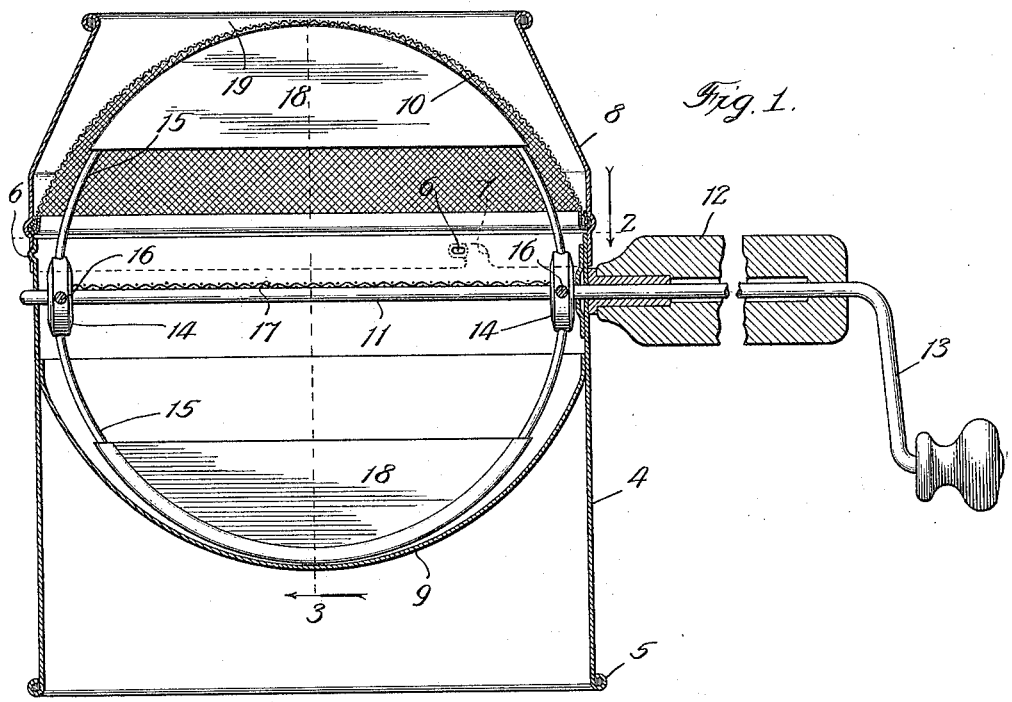
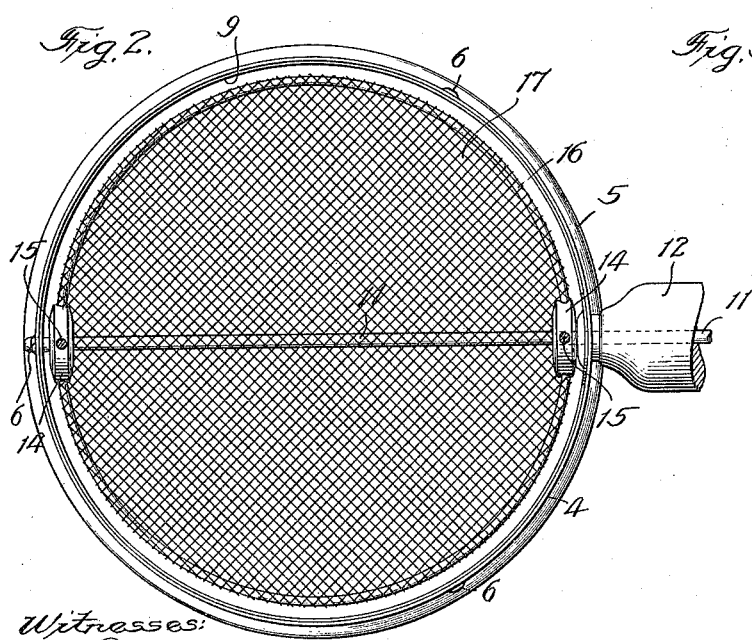
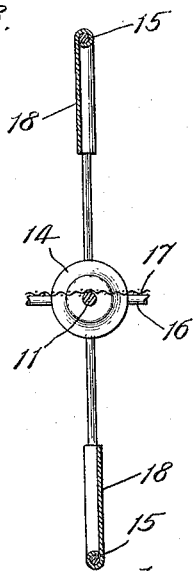
Inventor:
Helen Doyle,
By Dyrenforth, Lee, Chritton & Wiles
Att'ys.

UNITED STATES PATENT OFFICE.

HELEN DOYLE, OF CHICAGO, ILLINOIS.

SIFTER.

1,158,188.  Specification of Letters Patent.  Patented Oct. 26, 1915.

Application filed April 16, 1915. Serial No. 21,644.

*To all whom it may concern:*

Be it known that I, HELEN DOYLE, a citizen of the United States, residing at Chicago, in the county of Cook and State of Illinois, have invented a new and useful Improvement in Sifters, of which the following is a specification.

My invention relates to an improvement in the class of sifters in common use for culinary purposes for sifting flour, and the like.

The primary object of my invention is to provide a culinary utensil, of the kind referred to, of a construction which shall adapt it for use as a mixer as well as a sifter, whereby flour, or the like, may have other ingredients thoroughly mixed with it in the utensil before sifting the mixture.

In the accompanying drawing, Figure 1 shows my improved utensil by a view in vertical sectional elevation; Fig. 2 is a section on line 2, Fig. 1, with the tapering end of the shell removed, and Fig. 3 is a section through the rotatable beater on line 3, Fig. 1.

The shell or body of the sifter, of sheet-metal, is preferably formed of a cylindrical section 4 having a beaded seating-edge 5 and projections 6 at intervals about its opposite end, and an outwardly-tapering section 8 containing bayonet-slots 7, and which fits about the end of the section 4 and is releasably locked thereto by the projections entering the slots 7. In the section 4 is secured an imperforate concavely-rounded pan 9, or bottom, and in the section 8 is fastened, at its bound edge, a screen 10 of the same shape as the pan but extending oppositely thereto to cause the interior of the shell to approximate in shape, or form, a globular chamber.

In the section 4, midway between the parts 9 and 10, is journaled, to extend diametrically across the sifter, a shaft 11 running through a handle 12 rigidly secured to the outer wall of the shell, the shaft terminating beyond the handle in an operating crank-handle 13. On opposite ends of the shaft within the shell are provided button-like heads 14, 14, to which are rigidly fastened two wire rings 15 and 16 to extend at right angles to each other and be rotated in the globular chamber referred to. The ring 16 carries and forms the annular rim of a screen 17; and on opposite sections of the ring 15 are secured sheet-metal segment-like blades 18, 18.

To use the utensil, the matter therein to be sifted (for introducing which the section 8 is taken off, to be immediately replaced), is contained in the pan 9, which then is the bottom of the utensil. By rotating the shaft 11, the blades pick up the material and cast it against the screen 17, which also stirs the same; and the blades throw the material against the screen and with the latter effect thorough mixture thereof. When the mixing is done, the utensil is inverted over a suitable receptacle, (not shown) thereby introducing the material onto the screen 14; and by then turning the shaft 12, the rotating mixer acts upon the material in the same way as when in the pan 9, and works it though the screen 10 to sift it.

The discharge-opening 19, formed by the tapering shell-section, is advantageous in convergently directing the discharge of the sifted material into the receptacle to avoid scattering it or spilling it over the latter.

The utensil thus described affords a self-contained combined mixer and sifter, of simple construction and of exceptional efficiency in its purpose.

What I claim as new and desire to secure by Letters Patent is—

1. A flour-sifter comprising a shell having an imperforate mixing pan in fixed position in one end and a screen in fixed position in its other end, and a rotatable handle-equipped beater axially supported to be operated in the shell between and against the pan and screen.

2. A flour-sifter comprising a shell containing a globular chamber formed of an imperforate mixing pan and a screen respectively covering the opposite ends of the shell and in fixed position therein, and a rotatable handle-equipped ring-formed beater axially supported to be operated in said chamber.

3. A flour-sifter comprising a shell having a concave imperforate mixing pan in fixed position in one end and a concave screen in fixed position in its other end, said pan and screen forming a globular chamber, a handle secured on the shell, a shaft rotatably journaled in the shell to extend through the handle and terminating in a crank, and a beater supported on the shaft to operate in said chamber.

4. A flour-sifter comprising a shell having a concave imperforate pan in one end and a concave screen in its other end, said pan and screen forming a globular chamber, a handle secured on the shell, a shaft rotatably journaled in the shell to extend through the handle, and a beater formed of rings secured on the shaft to extend in angular relation to each other in said chamber and be operated against the pan and screen, one of said rings being screen-covered, and the other provided with blades.

5. A flour-sifter comprising a shell formed of a cylindrical section having an outwardly tapering section separably connected therewith, an imperforate concave pan in the cylindrical section and a concave screen in the tapering section, said pan and screen forming a globular chamber, and a rotatable handle-equipped beater supported to be operated in said chamber.

6. A flour-sifter comprising a shell formed of separably-connected sections, an imperforate concave pan in one section and a concave screen in the other section, said pan and screen forming a globular chamber, a handle secured on the shell, a handle-equipped shaft journaled in the shell, and a beater having a screen-covered ring and a ring provided with opposite blades, said rings being secured to the shaft to extend in angular relation to each other and coöperate in said chamber with said pan and concave screen.

7. In a flour sifter the combination of a shell, an imperforate pan in one end of the shell, and a screen in its other end, forming a chamber, a shaft rotatably journaled in the shell, and a beater formed of rings secured on the shaft to extend in angular relation to each other in said chamber, one of said rings being screen-covered and the other provided with blades.

HELEN DOYLE.

In the presence of—
K. O'NEILL,
D. C. THORSEN.

Copies of this patent may be obtained for five cents each, by addressing the "Commissioner of Patents, Washington, D. C."